United States Patent [19]

Yamamoto

[11] 4,282,985

[45] Aug. 11, 1981

[54] SEED PLATE

[76] Inventor: Ray Yamamoto, Rte. 1, Box 1376, Wapato, Wash. 98951

[21] Appl. No.: 113,827

[22] Filed: Jan. 21, 1980

[51] Int. Cl.³ .............................................. A01C 7/04
[52] U.S. Cl. .................................. 221/254; 221/266; 221/277; 111/77
[58] Field of Search ............... 221/266, 254, 277, 233, 221/234, 235; 111/77, 78

[56] References Cited

U.S. PATENT DOCUMENTS

| | | | |
|---|---|---|---|
| 2,054,552 | 9/1936 | Wakeham | 221/235 X |
| 2,440,846 | 5/1948 | Cannon | 221/233 |
| 2,645,385 | 7/1953 | Wechsler . | |
| 2,667,286 | 1/1954 | Raught . | |
| 2,679,950 | 6/1954 | Swanson . | |
| 2,855,125 | 10/1958 | Grimsbo | 221/266 |
| 2,975,936 | 3/1961 | Rousek | 221/235 X |
| 2,980,043 | 4/1961 | Beck | 111/77 |
| 3,219,000 | 11/1965 | Leach et al. | 111/77 |

OTHER PUBLICATIONS

John Deere Model 33, Vegetable Planter Operator's Manual pp. 2-9.

*Primary Examiner*—Allen N. Knowles
*Attorney, Agent, or Firm*—Graybeal & Uhlir

[57] ABSTRACT

A circular seed plate for use with a tilted, cylindrically shaped hopper includes a plurality of cells formed in, and spaced around, the circumference of the plate. Each seed cell includes an end surface which extends radially inwardly from the outer diameter in a direction toward the center of the plate, a trailing shelf surface which extends forwardly in the direction of rotation of the plate from the radially innermost end of the end surface, and a leading shelf surface which extends forwardly from the trailing shelf surface also in the direction of rotation of the plate. Ideally each leading shelf surface is substantially longer than its corresponding trailing shelf surface. The edge defined by the intersection of each leading shelf surface and the upper face of the seed plate is beveled along substantially the entire length of the leading shelf surface. As the seed plate rotates over the base of the hopper, several seeds are captured by each passing seed cell and then are pushed along by the trailing end surface toward an outlet opening formed in the top of the inclined hopper base. As the seeds approach the top of the travel of the plate, all of the seeds except one roll out of the cell so that only a single seed at a time is deposited into the ground.

11 Claims, 5 Drawing Figures

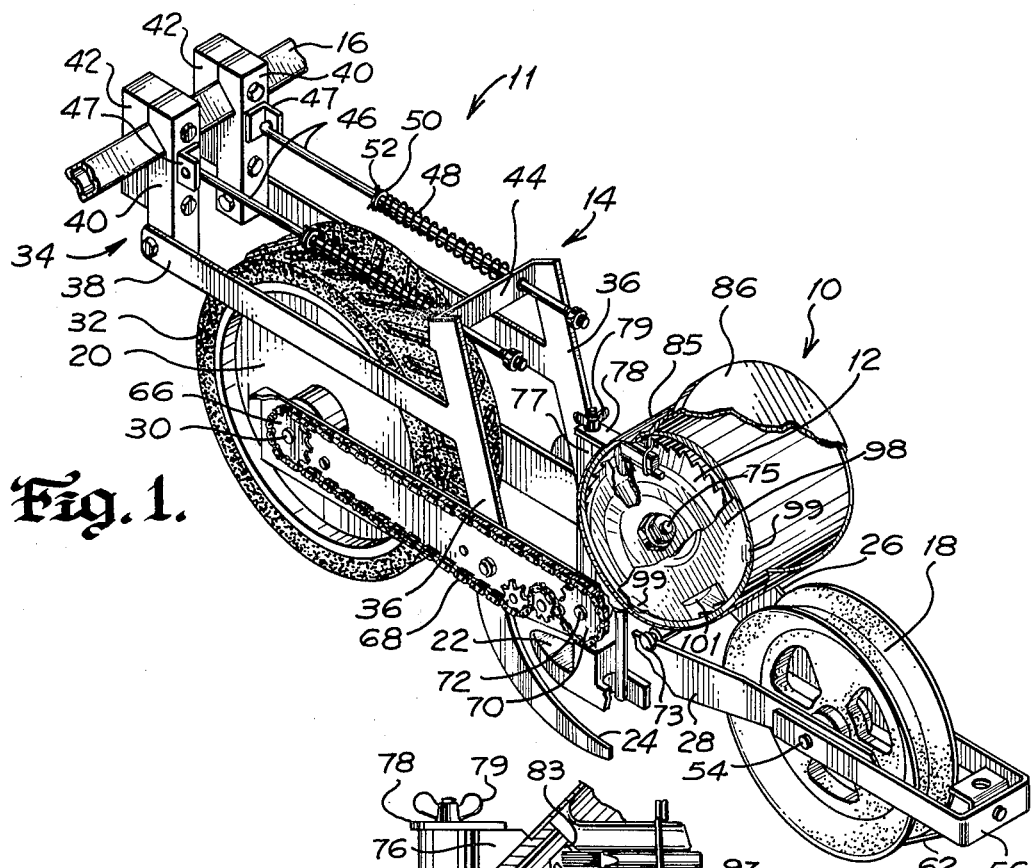
Fig.1.
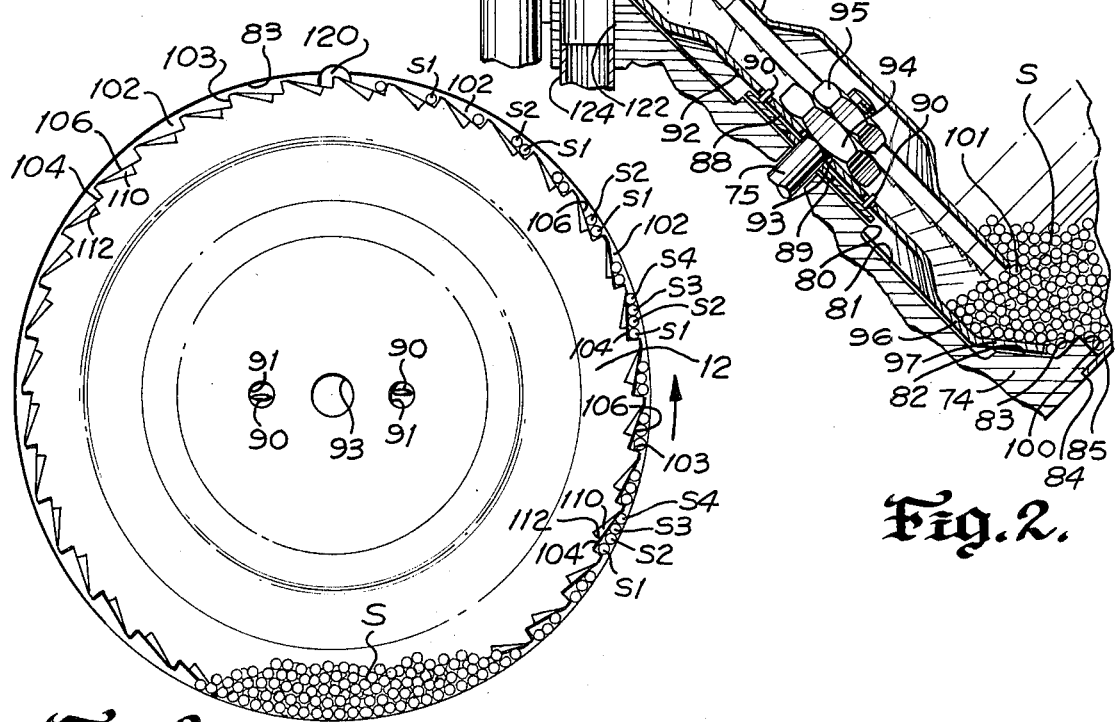
Fig.2.
Fig.3.

SEED PLATE

BACKGROUND OF THE INVENTION

1. Field of the Invention

The present invention relates to agricultural implements, and more particularly to a new seed plate for precisely picking up seeds from a hopper and depositing them one at a time into a furrow formed in the ground.

2. Description of the Prior Art

In the past, certain types of seeds, for instance vegetable seeds, were placed rather closely together within furrows formed in the ground. To achieve maximum yield, after the seeds sprouted, the plants were thinned so that only a single plant was allowed to grow at any location and so that the spacing between plants was uniform. If two or more plants were allowed to grow at a particular location, they would not mature properly thereby resulting in a significantly smaller, poor quality vegetable.

In recent years, to eliminate the expense and time required to manually thin the plants, precision seeders have been developed to theoretically deposit only one seed at a time into the ground. One known type of such seeding mechanism includes a vertical hopper mounted on a wheeled frame which is pulled behind a tractor. A vertically oriented, circular, rotating seed plate or wheel, having a plurality of seed receiving cells formed about its circumference, is disposed either partially within the seed hopper or at least in communication with the seed hopper. The portion of the seed plate disposed externally of the hopper is rotatably journaled within a closely fitting housing having a seed outlet opening in its bottom. As the seed plate rotates through the hopper, a single seed is theoretically picked up by each cell and then carried upwardly around the circumference of the plate and then downwardly until it drops through the outlet opening at the bottom of the seed plate housing. The closely fitting housing prevents seeds from falling off the seed plate before reaching the housing outlet opening.

Seed cells of various configurations have been formed in vertical seed plates. One known type of seed cell is shaped similar to ratchet teeth, each cell having a radially disposed trailing face and a leading angular face extending from the inner end of the radial face forwardly in the direction of rotation of the plate. A spherical recess or pocket is formed in the trailing radial face for receiving a single seed therein. Ideally the seed remains in the cell pocket until the cell is in its downward travel. Examples of seed plates utilizing this type of cell are disclosed by Wechsler, U.S. Pat. No. 2,645,385; and Raught, U.S. Pat. No. 2,667,286.

In another type of vertical seed plate formed with ratchet teeth shaped cells, a seed pocket for receiving a seed therein is formed in the root portion of each cell, at the intersection of the radial and angular cell faces. An example of a seed plate utilizing this type of cell configuration is disclosed by U.S. Pat. No. 2,980,043 to Beck.

One drawback of seed plates utilizing ratchet teeth shaped seed cells with a seed receiving pocket formed therein is that if the pocket is formed in a size corresponding to the average size of the particular type of seed being planted, larger seeds will not fit within the pocket so they either are crushed or they fall out of the pocket causing a skip or miss to occur in the row of plants. Alternatively, if the cell is formed in a size substantially larger than the nominal size of the seeds to thereby increase the possibility that a seed will be picked up by each cell, more than one smaller sized seed at a time might lodge within the pocket so that a double or even triple set of plants could sprout at one location. When this occurs, the plants must be manually thinned. Furthermore, since the seed pocket normally does not occupy the entire surface area of each cell face, additional seeds may lodge on the portions of the seed cell surfaces surrounding the pocket resulting in several seeds simultaneously dropping onto the ground.

In a further type of vertically disposed seed plate, hook-shaped cells are spaced around the circumference of the plate. Each of these hook-shaped cells includes a short, radially extending trailing surface, an arcuate surface disposed radially inwardly from the trailing surface, a radially disposed leading surface and an intermediate surface interconnecting the arcuate surface with the leading surface. A generally semi-circular shaped seed-receiving pocket is formed in the trailing surface of each seed cell. The seed pocket opens circumferentially forwardly in the direction of rotation of the seed plate. The faces of the seed plate are beveled in the region of the arcuate surface of each seed cell, in a manner similar to the blade of a knife, to form a central edge of insufficient width to support a seed therealong. In operation, as a seed cell travels upwardly through a hopper, a seed is theoretically lodged within the pocket formed in the cell trailing surface. However, the beveled arcuate portion of the seed cell prevents additional seeds from being lodged thereon. As the cell reaches the top of the travel of the plate, the seed falls out of the pocket and down onto the intermediate cell surface. Then, as the cell begins to travel downwardly, the seed rolls down to the transversely flat, leading surface of the cell, at which location the seed is supported until it drops out of an opening provided at the bottom of the seed plate housing. Although this particular seed cell design might reduce the possibility that more than one seed at a time may be picked up by a cell, it is also quite possible that as the cell rotates through the hopper no seed may actually lodge within the cell pocket. If this occurs, a skip will exist in the row of plants. An example of a seed plate utilizing this particular type of cell configuration is disclosed by Grimsbo, U.S. Pat. No. 2,855,125.

In another type of vertically disposed seed plate, semi-circularly shaped cells are formed in the circumferential rim portion of the plate. Each of the cells is open in the direction facing radially outwardly from the plate to receive a seed therein as the plate rotates through the hopper. The seed deposited with the cell travels along the circular path swept by the cell and then falls downwardly out an opening provided at the bottom of the seed plate housing. Because the seed cell must be formed large enough to accommodate the larger sized seeds within the hopper, not uncommonly two or even three more smaller seeds at a time occupy a single cell. Furthermore, even though the pockets might be formed in a size generally approximately the size of the largest seeds in the hopper, it is possible that two or three large seeds could be clustered together adjacent the rim of the seed plate so that none of the seeds actually drop into a passing cell. An example of this type of seed plate is disclosed by U.S. Pat. No. 2,679,950 to Swanson.

The above mentioned seed plates all rotate within a closely fitting housing. Consequently, as a seed cell rotates by the hopper, seeds are often clustered at the location where the plate enters the housing. Then, due to debris or oversized seeds in the area, the clustered seeds cannot move away from the housing but become trapped and crushed between the plate and the housing sidewall or cut by an edge of a passing cell end wall.

In another type of seeder, a cylindrically shaped hopper is mounted on a wheeled frame structure which in turn is pulled by a tractor. Rather than being mounted vertically, the hopper is tilted rearwardly so that the seeds collect in the lowermost portion of the inclined hopper. A circularly shaped seed plate is located just above the bottom of the hopper. The seed plate closely fits within the inside diameter of the hopper and is orientated at the same slope as the bottom of the hopper. Seed receiving cells in the shape of saw teeth are formed around the circumference or periphery of the inclined seed plate. The seed plate is powered to rotate through the seeds located within the hopper to ideally capture a single seed within the cavity formed by the seed cell and the inside diameter of the hopper, and then carry the seed up the inclined hopper bottom and deposit it within an outlet opening formed at the top of the incline. From the outlet opening, the seed travels through a delivery tube and into a furrow dug by a cultivator shoe traveling in front of the hopper.

Under ideal conditions, one seed at a time is captured within each seed cell. Unfortunately, however, seeds of a particular crop are not always of uniform size and shape. Thus, the seed plate cell must be sized large enough to accommodate the largest seeds. Even so, not infrequently a seed is not captured by a seed cell as the plate rotates through the lowest level of the hopper causing a skip in the row of plants. Moreover, it is not uncommon for more than one smaller sized seed at a time to be captured by a cell and deposited in the hopper outlet opening. This results in the growth of multiple plants which must be thinned by hand. An example of a seeder utilizing this particular type of seed plate is the Model 33 Vegetable Planter manufactured by John Deere and Company.

Accordingly, it is a primary object of the present invention to provide an improved seed plate which is especially adapted to precisely deposit one seed at a time into the ground.

SUMMARY OF THE INVENTION

The present invention relates to a novel, rotating seed plate for use with a cylindrically shaped seed hopper having an inclined, circular base, and upstanding side wall extending around the circumference of the base and a seed dispensing opening in the base at the top of the incline. In basic form, the seed plate is disposed within the hopper to overlie the base upper surface and closely fit within the inside diameter of the hopper. The seed plate has a lower face adjacent the hopper base, an upper face facing opposite the hopper base and a plurality of elongate seed cells formed in, and spaced around, the circumference of the seed plate. Each of the seed cells includes an end surface which extends radially inwardly from the outward diameter toward the center of the seed plate a distance substantially equal to the thickness of the plate. Each seed cell also contains a trailing shelf surface which extends generally forwardly in the direction of rotation of the seed plate from the radially innermost portion of an end surface. The length of each trailing shelf surface is substantially equal to the radial length of each end surface and the thickness of the seed plate itself. Each seed cell is also formed with a leading end surface extending substantially radially inwardly from the end of each trailing shelf surface opposite the trailing end surface, and a leading shelf surface extending forwardly in the direction of rotation of the plate from the radially innermost portion of a corresponding leading end surface. Each leading shelf surface is substantially longer than its corresponding trailing shelf surface. Also, the edge of the seed plate defined by the intersection of each leading shelf surface and the upper face of the seed plate is beveled along substantially the entire length of the leading shelf surface. Moreover, each cell trailing surface is beveled in the direction toward the seed plate lower face.

In operation, as the seed plate rotates within the hopper, several of the seeds which have collected at the bottom of the hopper floor are captured by each elongate seed cell. Typically, one of the seeds (denominated a primary seed) rolls over the hopper base as it is pushed along by the trailing end surface. One, two or even three additional or secondary seeds are disposed forwardly of the primary seed and also roll or slide over the hopper base as they are urged forwardly by the trailing primary seed. As the seed plate rotates further and the seeds within each cell travel along the central portion of the inclined hopper floor, the primary seed bears downwardly against the trailing end surface while the secondary seeds bear downwardly against the primary seed. Then, as the cell approaches the top of the travel of the seed plate, the primary seed bears principally downwardly against the trailing shelf surface while the secondary seeds bear primarily downwardly against the leading shelf surface. Since the leading shelf surface is beveled towards the top face of the seed plate, the secondary seeds roll out of the cell and down to the bottom of the hopper. The primary seed, however, continues upwardly along the travel of the seed plate held in place by the oppositely beveled trailing shelf surface and the end surface until the seed drops through an opening formed in the top of the inclined hopper base.

It is a primary object of the present invention to provide a seed plate for precisely depositing seeds from a hopper one at a time into the ground regardless of variations in the size and shape of the seeds being planted.

A further object of the present invention is to provide a seed plate which picks up several seeds at a time from the bottom of the hopper and then subsequently returns to the bottom of the hopper all the seeds except one which is planted in the ground.

Another object of the present invention is to provide a seed plate which feeds seeds from a hopper into the ground without breakage of the seeds.

An additional object of the present invention is to provide a seed plate capable of releasing one seed at a time from a hopper into the ground even though the hopper contains straw and other foreign matter.

Still a further object of the present invention is to provide a seed plate which is simple and inexpensive to manufacture, highly efficient in operation, and also durable in use.

BRIEF DESCRIPTION OF THE DRAWINGS

FIG. 1 is an isometric view of one typical embodiment of the present invention with portions broken away for clarity;

FIG. 2 is an enlarged cross sectional view of the typical embodiment of the present invention shown in FIG. 1, taken substantially along lines 2—2 thereof;

FIG. 3 is an enlarged plan view of a typical embodiment of the seed plate illustrated in FIG. 1;

DESCRIPTION OF THE PREFERRED EMBODIMENTS

Figure 4:
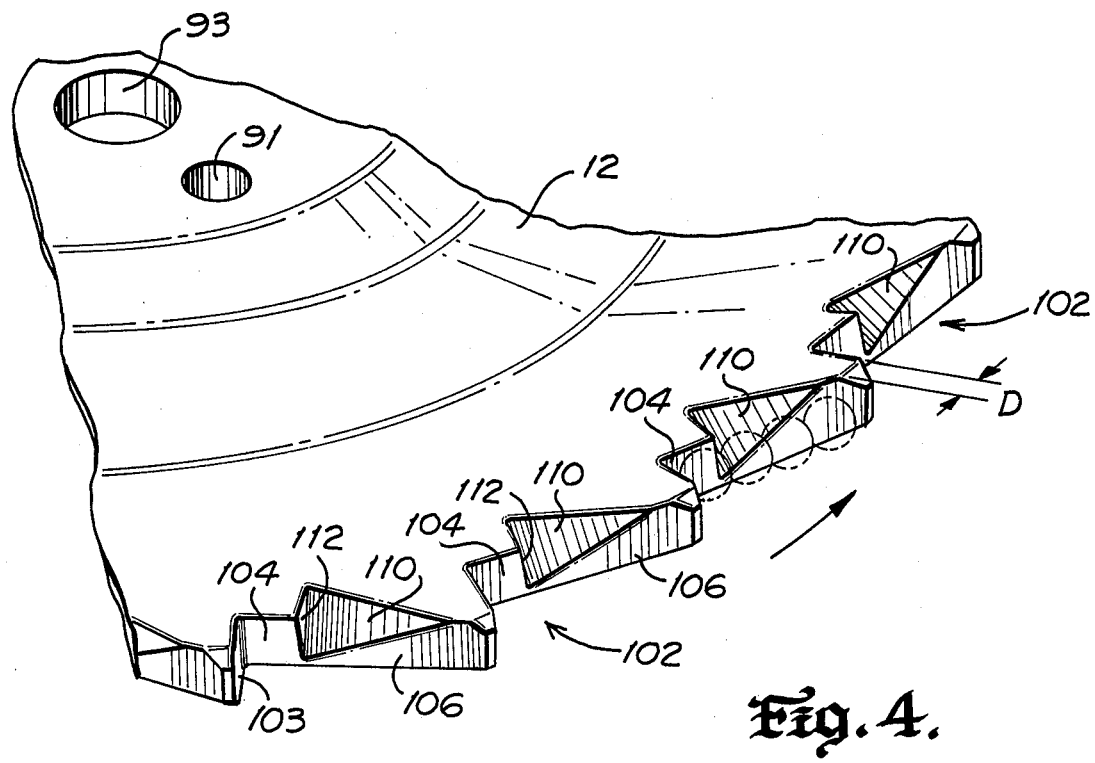
FIG. 4 is a greatly enlarged, fragmentary, isometric view of a portion of the seed plate illustrated in FIG. 3.

Referring initially to FIG. 1, disposed within hopper 10 of a seed planting machine 11 is a seed plate 12 which is constructed according to the present invention and which is also the best mode of the invention currently known to applicant. Hopper 10 is mounted on a frame 14 which is supported at its forward end by drawbar 16 and at its rearward end by a pair of ground engaging pressing wheels 18. A ground engaging driving wheel 20 is mounted on frame 14 at a location forward of hopper 10 to rotationally drive seed plate 12. A cultivator type shoe 22 depends downwardly from frame 14 to dig a furrow in the ground in which seeds from hopper 10 are deposited. The seeds are then covered by a pair of knives 24 trailing behind shoe 22.

Referring specifically to FIG. 1, frame 14 includes a pair of transversely spaced, longitudinally extending side members 26 and 28, which compose the trailing portion of frame 14. An axle shaft 30 extends between the forward ends of frame slide members 26 and 28 to carry ground engaging, drive wheel 20. Preferably, drive wheel 20 has a treaded rubber tire 32 to provide the necessary traction between wheel 20 and the ground to drive seed plate 12. Frame 14 also includes a front subassembly 34 having a pair of upright legs 36 which are attached to frame side members 26 and 28 at a longitudinal location between drive wheel 20 and hopper 10. Legs 36 extend upwardly from side members 26 and 28 to intersect the rear ends of horizontally disposed arms 38. The forward end of each arm 38 is in turn bolted to the lower end portion of a corresponding rear mounting block half 40. Each rear mounting block half 40 is in turn bolted to a front mounting block half 42 to clamp therebetween draw bar 16. The upper end portions of legs 36 are interconnected by a transverse plate 44. A pair of apertures are formed in plate 44 for receiving therethrough the rear end portions of elongate rods 46. The forward end portions of each rod 46 are pivotally anchored to an angle bracket 47 fixed to the rear surface of each rear mounting block half 40. A compression spring 48 is engaged over each rod 46 and pressed against the front face of transverse plate 44 by a sliding washer 50 which can be selectively positioned along the length of rod 46 by a cotter key 52 engaging through one of several longitudinally spaced apart holes cross drilled through rod 46. Compression springs 48 press against the transverse plate 44 to maintain the cultivator type shoe 22 and knives 24 engaged within the ground while still permitting the rear end portion 14 to pivot upwardly to ride over rocks, large dirt clods and other objects which may be lying on the ground.

As best illustrated in FIG. 1, a pair of conventional pressing wheels 18 are rotatably mounted on an axle 54 which extends through openings located at the rear end portions of frame slide members 26 and 28. Pressing wheels 18, in addition to supporting the rear end of frame 14, give a final packing to the earth after the furrow opened by cultivator shoe 22 has been filled in by covering knives 24. A generally U-shaped frame member 56 has its free or forward end portions apertured to engage over pressing wheel axle 54 and outwardly overlap the frame side members 26 and 28. Member 56 also includes a central, transverse portion which is disposed rearwardly of wheels 18. A scraper blade 62, having forwardly and downwardly directed scraping edges shaped to correspond to the contour defined by the two pressing wheels 18, is mounted on the central portion of bracket 56 to scrape wheels 18 clean if soil happens to stick to them.

Again referring specifically to FIG. 1, the power to rotatably drive seed plate 12 is generated by the rotation of drive wheel 20 over the ground. A drive sprocket 66 is detachably mounted on the free end of axle shaft 30 which rotates with drive wheel 20. A drive chain 68 connects drive sprocket 66 with driven sprocket 70 which is detachably mounted on the adjacent end of a transverse shaft 72. Transverse shaft 72 is journaled beneath base portion 74 of hopper 10. A first bevel gear, not shown, is engaged over the central portion of transverse shaft 72 to mesh with a second mating bevel gear, not shown, affixed to the lower end portion of drive shaft 75 which extends transversely upwardly through base portion 74 and into the interior of hopper 10.

Hopper 10 is mounted on frame 14 in a rearwardly tilting orientation to closely overlie the upper, forward quadrant of pressing wheels 18. Lug members 73 extends transversely outwardly from each side of hopper base portion 74 at a location behind transverse shaft 72. Lug members 73 are downwardly receivable within an upwardly directed slot formed in the upper edge portion of side frame members 26 and 28 to support the rear portion of hopper base 74. An additional, vertically elongate lug 76 extends forwardly from the central portion of hopper base 74 to rest against a vertical post 77 extending upwardly from frame side members 26 and 28. A flat keeper plate 78 is held in place at the upper end of post 77 by a wing screw 79 which extends through a clearance hole provided in plate 78 and into a threaded opening formed in vertical post 77. Keeper plate 78 presses downwardly on the upper surface of forward lug 76 to hold the forward portion of hopper base 74 secure with post 77.

Referring primarily to FIG. 2, hopper base 74 is generally circular in shape with the upper surface of base 74 forming the floor of hopper 10. The upper face of base 74 includes a flat, raised, circular, central surface 80; a depressed, flat, intermediate, annular surface 81 surrounding central surface 80; and a sloped, outer, annular surface 82 which extends radially outwardly and diagonally upwardly relative to intermediate annular surface 81. At the bottom or lowest elevation of hopper base 74, annular surface 82 is substantially horizontal, while at the top or highest elevation of hopper base 74, annular surface 82 is substantially vertical. A relatively short interior wall 83 extends upwardly from the outer circumference of annular surface 82 to form the maximum inside diameter of base 74. A shoulder 84 is formed in the outer circumference of base 74 to snugly receive the lower edge portion of the cylindrically shaped hopper wall 85 which extends upwardly from base 74 to form a receptacle for receiving a supply of seeds S. A removable cover 86 snaps over the top of hopper wall 85 to prevent dust, rain and other undesirable matter from entering hopper 10.

A circular seed outlet opening 120 is formed at the top of sloped base 74 to break through outer annular surface 82 and a portion of intermediate annular surface 81. As illustrated in FIG. 2, opening 120 initially extends perpendicularly to the plane defined by base intermediate annular surface 81 and then extends vertically downwardly through base lug 76. A counterbore 122 is formed in the lower portion of opening 120 for slidably receiving the upper end of an elongate circular discharge tube 124. The lower end of tube 124 extends downwardly between the two sides of cultivator shoe 22 to direct seeds into a furrow formed by the shoe.

Again referring to FIGS. 2 and 3, a flat circular drive plate 88, of a size slightly larger than the diameter of base central surface 80, overlies said central surface. A square-shaped opening is formed in the center of drive plate 88 to engage over a correspondingly shaped drive nut 89 affixed to shaft 75 to thereby enable shaft 75 to rotatably drive plate 88. Drive plate 88 includes a pair of flat, diametrically opposed, upwardly extending drive pins 90 which engage through correspondingly located openings 91 provided in the upwardly dished, central circular portion 92 of seed plate 12 to drive the seed plate as shaft 75 rotates. A clearance opening 93 is formed in plate central portion 92 for receiving drive shaft 75 therethrough. Seed plate 12 is maintained in engagement with drive pins 90 by a large adjusting nut 94 which engages with the threaded upper end portion of drive shaft 75. A smaller lock nut 95 is provided to also engage with the upper end portion of drive shaft 75 to prevent adjusting nut 94 from loosening.

Except for the upwardly dished central portion 92, seed plate 12 is shaped to closely correspond to the profile of the upper surface of hopper base 74. Accordingly, plate 12 includes a flat, annular, intermediate portion 96 extending around central portion 92 and closely overlying the intermediate annular surface 82 of base 74. The marginal or circumferential portion 97 of plate 12 extends upwardly and outwardly from intermediate portion 96 at the same slope as hopper base annular surface 82 to actually slide over said surface 82 as plate 12 rotates. The outer circumference of plate 12 closely matches the inside diameter of hopper base 74 as defined by wall 83. As with hopper base outer annular base surface 82, at the bottom of the rotation of plate 12, the circumferential portion 97 of plate 12 is substantially horizontally disposed, while at the top of the rotation of the plate, circumferential portion 97 is substantially vertically disposed.

As best illustrated in FIGS. 1 and 2, a circular baffle plate 98 is closely receivable with hopper 10. Baffle plate 98 includes a plurality of outwardly directed tabs 99 which overlap the upper edge 100 of hopper base 74 to thereby support and centrally locate baffle plate 98 within hopper 10. A generally rectangularly shaped opening 101 is formed in the lowermost portion of plate 98 to limit the number of seeds which reach seed plate 10 at any given time. Baffle plate 98 reduces the possibility that the lowermost seeds would be crushed or otherwise broken under the weight of the seeds located above and by the action of the rotating plate 12.

Referring to FIGS. 3 and 4, a plurality of substantially identical seed cells 102 are formed around the circumferential portion 97 of plate 12. Each cell 102 includes a trailing end surface 103 which extends generally radially inwardly from the outer circumference of plate 12 a distance substantially equal to the thickness of the plate. Ideally, this distance is also substantially equal to the diameter or length of seeds being planted. The plane defined by end surface 103 is substantially perpendicular to the plane of circumferential portion 97.

Each cell 102 also includes a trailing shelf surface 104 which extends generally perpendicularly from the radially inner end of trailing end surface 103 forwardly in the direction of rotation of plate 12, as indicated by the arrows in FIGS. 3 and 4, towards the outer circumference of the plate. The length of trailing shelf surface 104 is ideally the same as the length of trailing end surface 103. The plane defined by shelf surface 104 is not perpendicular to the plane of plate circumferential portion 97, rather shelf surface 104 is beveled or canted in a direction towards the lower face of plate 12. Each cell 102 further includes a leading shelf surface 106 which extends longitudinally forwardly of trailing shelf surface 104 to intersect with the outer circumference of plate 12. In preferred form, leading shelf surface 106 is from two to three times the length of trailing shelf surface 104. The edge defined by the intersection of the upper face of plate 12 and the plane of the leading shelf surface 106 is beveled to form a sloped surface 110 which is inclined transversely of the plane of leading shelf surface 106 in the direction toward the upper face of plate 12. Beveling leading shelf surface 106 to establish sloped surface 110 results in the formation of a leading end surface 112 which extends generally radially inwardly from the end of trailing shelf surface 104 opposite trailing end surface 103 to intersect with the adjacent end of sloped surface 110. As discussed more fully below, leading shelf surface 106 enables each cell 102 to capture more than one seed at a time from the bottom of hopper 10 and then sloped surface 110 allows the extra seeds to roll out of cell 102 as they approach the top of the travel of plate 12. As most clearly shown in FIG. 4, sloped surface 110 tapers or narrows from its maximum width adjacent leading end surface 112 to a minimum width at the opposite end of surface 106. Forming sloped surface 110 in this manner enables seeds $S_2$ and $S_3$ to fall out of cells 102 while not significantly reducing the thickness of plate 12 in this region, thereby maintaining the ruggedness and durability of the plate. The conformation of 106 and 110 permits maximum holding position of seeds $S_2$ and $S_3$. The weight of $S_3$ on $S_2$ during the inclined rotation cycle of plate 12 holds $S_2$ in place though surface 106 is narrow. The downward pressure of $S_3$ on $S_2$ facilitates replacement of $S_1$ by $S_2$ to fill surface 104, if $S_1$ happened to be a fragment or an irregular shaped debri.

Cells 102 are ideally uniformly spaced apart around the circumference of plate 12 with a circumferential distance D separating the forward end of one leading shelf surface 106 and the trailing end surface 103 of a next adjacent cell 102. It will be understood that the distance D separating adjacent cells 102 can be decreased to increase the number of cells for a given diameter seed plate and thereby decrease the distance separating adjacent seeds when planted in the ground. Alternatively, the distance D can be increased to decrease the number of seed cells 102 for a given diameter plate to thereby increase the distance separating adjacent seeds when planted in the ground. The spacing separating the planted seeds can also be varied by altering the speed at which plate 12 rotates in relationship to the rotational speed of drive wheel 20. This is accomplished by replacing drive sprocket 66 and/or driven sprocket 70 with sprockets containing different numbers of teeth to thereby alter their relative drive ratio.

To use seeder 11 to plant seeds S in the ground, first a particular drive sprocket 66 and driven sprocket 70 are selected to obtain the proper ratio of teeth therebetween so that the seeds S are spaced a desired distance apart in the ground. Next, seed plate 12 is installed within hopper 10 by placing the central opening 93 downwardly over drive shaft 75 so that drive pins 90 on drive plate 88 extend upwardly through spaced apart holes 91. Then adjusting nut 94 and lock nut 95 are engaged with the threaded upper end of drive shaft 75 to secure seed plate 12 and drive plate 88 together so that plate circumferential portion 97 rides over the sloped outer annular surface 82 of hopper base 74. Next, baffle plate 98 is placed within hopper 10 so that opening 101 is located at the lower most portion of hopper base 74. Thereafter, seeds S are placed within hopper 10. Most of the seeds S will collect on top of baffle plate 98 while a lesser number pass through opening 101 to the very bottom of hopper 10 to lie on top of plate 12 and fill cells 102.

When seeder 11 is pulled by a tractor, not shown, drive wheel 20 rolls over the ground to rotatably drive seed plate 12 through sprockets 66 and 60 and chain 68. As seed plate 12 rotates within hopper 10, cells 102 sweep through seeds S located at the bottom of hopper 10. Applicant has found that normally three or four seeds S ($S_1$, $S_2$, $S_3$ and $S_4$) are captured by each cell 102. During their initial travel, when leaving the lowermost level of hopper 10 until reaching an elevation corresponding to approximately the center of plate 12, a primary seed $S_1$ typically rolls or slides over base outer annular surface 82 as it is pushed along by cell trailing end surface 103. The other two or three secondary seeds $S_2$, $S_3$ and $S_4$ are located in front of and are urged forwardly by primary seed $S_1$. Trailing end surface 103 is wide enough and plate 12 is thick enough to enable the seeds $S_1$, $S_2$, $S_3$ and $S_4$ to roll up annular surface 82 and over any foreign matter, such as dirt or straw, which may be lying thereon without the seeds falling out of a cell 102. If plate 12 is too thin, the seeds would roll over end surface 103 and out cell 102 when encountering debris on annular surface 82.

Applicant has discovered that if dirt or other foreign matter is picked up by a cell 102 as it sweeps through seeds S so that the foreign matter assumes the location of a primary seed $S_1$ by resting against trailing end surface 103, oftentimes the foreign matter will roll out of or otherwise fall out of cell 102 during its travel up the inclined annular surface 82. If this occurs, the two or three secondary seeds $S_2$, $S_3$ and $S_4$ located in front of the foreign matter simply roll downwardly within cell 102 so that seed $S_2$ bears against trailing end surface 103.

Figure 5:
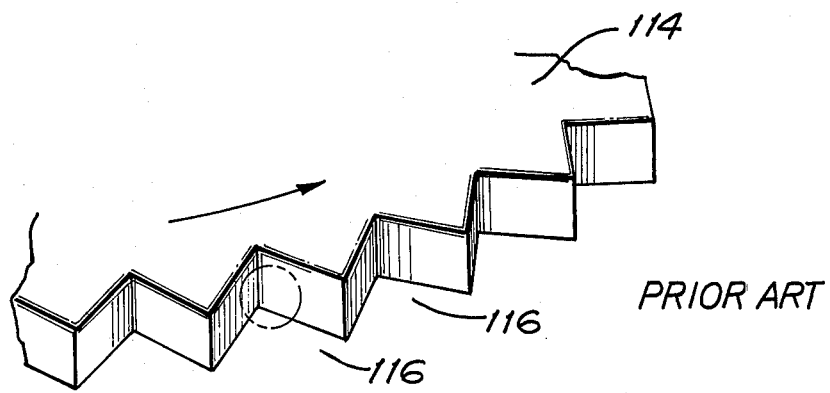
FIG. 5 is greatly enlarged, fragmentary, isometric view of a prior art seed plate.

In a conventional seed plate 114, as illustrated in FIG. 5, the cells 116 are designed to receive one seed at a time. Thus, if debris is disposed within conventional cells 116 and then later ejected, no additional seeds are available to occupy the cell left vacant by the debris. Consequently, a skip in the row of planted seeds will occur.

As plate 12 continues to rotate, the segment of the plate circumferential portion occupied by a cell 102 becomes steeper until reaching a substantially vertical orientation at the top of the travel of plate 12, as illustrated in FIG. 2. Also, during this part of the travel of cell 102, seed cell trailing and leading shelf surfaces 104 and 106, respectively, carry an increasing proportion of the weight of the seeds while the proportion of the weight of the seeds carried by cell trailing end surface 103 correspondingly diminishes. As the seeds approach the top of hopper base 74 and plate circumferential portion 97 approaches a more vertical orientation, leading shelf surface is no longer able to retain the secondary seeds $S_2$, $S_3$ and $S_4$. As a consequence, they roll downwardly over sloped surface 110 and out of cell 102. After rolling out of cell 102, the secondary seeds fall back to the bottom of hopper base 74 and thus are available to fill another seed cell 102. During this portion of the cell travel, primary seed $S_1$ rests principally against trailing shelf surface 104 which is beveled or sloped oppositely to surface 110, towards the underside of plate 12 to urge seed $S_1$ against base circumferential portion 97 and thus prevent the primary seed from falling out of cell 102. By the time cell 102 reaches outlet opening 120, only the primary seed $S_1$ remains within the cell, which seed drops through opening 120 and down tube 124 into the furrow formed by cultivator shoe 22. Once seed $S_1$ is deposited in the ground, knives 24 cover the furrow and then wheels 18 press the soil above the seed to prevent moisture from escaping too rapidly from the dirt surrounding the seed.

It will be appreciated that forming cell 102 long enough to establish a trailing shelf surface 104 for supporting at least two secondary seeds $S_2$ and $S_3$ significantly increases the possibility that at least one seed is deposited within each cell 102 as it sweeps through the seeds located at the bottom of hopper base 74. As a consequence, the possibility of a skip occurring in a row of seeds planted in the ground is greatly reduced. Furthermore, if more than one seed at a time is deposited with a cell 102, the secondary seeds $S_2$, $S_3$ and $S_4$ will roll over beveled surface 110 of leading shelf surface 106 as the seeds approach the top of the travel of plate 12. As a result, only a single or primary seed $S_1$ will be left within the cell 102 by the time the cell reaches outlet opening 120. Thus, the time consuming and expensive manual process of thinning the plants, once the seeds have germinated, is eliminated.

Although seeds S are illustrated in FIGS. 2-4 as being round in form seed plate 12 is equally capable of accurately depositing seeds of other shapes, such as elongated oval bean seed or irregular shaped corn seed, one at a time into discharge tube 124. As with round seeds, several bean or corn seeds are captured by each passing cell 102 and the secondary seeds also slide off leading shelf surface 106 as cell 102 approaches the top of its travel. The proper thickness of the plate 12 at the circumferential portion 97 and the conformation of cell 102 are constructed to accommodate the pellet to be singly dropped.

Furthermore, plate 12 is described above as including an upwardly dished central portion 92, a flat intermediate annular portion 96 extending around central portion 92 and an upwardly sloped circumferential portion 97 wherein cells 102 are located. Rather than being constructed in this manner plate 12 could be formed entirely flat as long as the base 74 of hopper 10 is also flat and cells 102 are shaped in the novel configuration described above.

It will be appreciated that although seed plate 12 was intially developed to precisely deposit seeds one at a time in the ground, plate 12 can be utilized for numerous other funcations, for instance, to feed machine components, such as ball bearings, into an automatic assembly machine.

The invention may be embodied in other specific forms without departing from the spirit or essential characteristics thereof. The present embodiments are therefore to be considered in all respects as illustrative and not restrictive, the scope of the invention being set forth in the appended claims rather than being limited to the specific embodiments described in the foregoing description.

What is claimed is:

1. In a hopper having an inclined base portion, upstanding side walls extending upwardly from the base portion and an outlet opening in the base portion at the top of the incline, the improvement comprising a circular seed plate removably disposed within the hopper to overlie the base portion, said plate powered to rotate about its central axis and having a lower face adjacent the hopper base portion, an upper face opposite the hopper base portion and a plurality of cells spaced about the circumference of said plate, each of said cells including:

an end surface extending generally radially inwardly from the outer diameter of said plate;
   a trailing shelf surface extending from the radially inner end of said end surface forwardly in the direction of rotation of said plate towards the circumference of said plate; and
   a leading shelf surface extending longitudinally forwardly of said trailing shelf surface, said leading shelf surface having a beveled edge portion extending along the intersection of the upper face of said plate and said leading shelf surface.

2. The improvement according to claim 1, wherein the length of each seed cell end surface is substantially equal to the length of its corresponding seed cell trailing shelf surface.

3. The improvement according to claim 2, wherein the thickness of said seed plate is substantially equal to the length of each seed cell end surface and trailing shelf surface.

4. The improvement according to claim 1, 2 or 3, wherein each seed cell leading shelf surface is substantially longer than the length of its corresponding trailing shelf surface.

5. The improvement according to claim 1, wherein said seed cell trailing shelf surface is beveled in the direction toward said plate lower face.

6. The improvement according to claim 5, wherein the length of each seed cell trailing shelf surface is approximately equal to the length of its corresponding seed cell end surface and substantially shorter than the length of its corresponding cell leading shelf surface.

7. The improvement according to claim 1, wherein the width of the beveled edge portion of each seed cell leading shelf surface is wider at the rearward end of said leading shelf surface adjacent said trailing shelf surface than at the forward end of said leading shelf surface disposed opposite said trailing shelf surface.

8. In a cylindrically shaped seed hopper having an inclined base portion, an upstanding side wall extending around the circumference of the base portion and a seed dispensing opening in the base portion at the top of the incline, the improvement comprising a circular seed plate disposed within the hopper to closely overlie the hopper base portion, said plate powered to rotate about its central axis and having a lower face adjacent the hopper base portion, an upper face opposite the hopper base portion and a plurality of seed cells spaced about the circumference of said plate, each of said cells including:

a trailing end surface extending substantially radially inwardly from the outer diameter of said plate;
   a trailing shelf surface extending generally forwardly in the direction of rotation of said plate from the radially innermost portion of said end surface, the length of said trailing shelf surface being substantially equal to the radial length of said end surface;
   a leading end surface extending substantially radially inwardly from the end of said trailing shelf surface opposite said trailing end surface; and
   a leading shelf surface extending forwardly in the direction of rotation of said plate from the radially innermost portion of said leading end surface, said leading shelf surface having a beveled edge portion extending along the upper face of said plate.

9. The improvement according to claim 8, wherein the thickness of said seed plate is substantially equal to the length of said seed cell trailing shelf surfaces.

10. The improvement according to claims 8 or 9, wherein each seed cell leading shelf surface is substantially longer than the length of its corresponding seed cell trailing shelf surface.

11. The improvement according to claim 8, wherein each seed cell trailing shelf surface is beveled in the direction toward the seed plate lower face.

* * * * *